July 1, 1924.

J. H. HANCOCK 1,499,981

BOLL WEEVIL COLLECTOR

Filed Sept. 26, 1922   2 Sheets-Sheet 1

J.H.Hancock, Inventor

By C.A.Snow&Co.
Attorney

July 1, 1924.

J. H. HANCOCK

BOLL WEEVIL COLLECTOR

Filed Sept. 26, 1922   2 Sheets-Sheet 2

J. H. Hancock, Inventor

By C. A. Snow & Co.,
Attorneys

Patented July 1, 1924.

1,499,981

UNITED STATES PATENT OFFICE.

JOSEPH H. HANCOCK, OF SCOTTSBORO, ALABAMA.

BOLL-WEEVIL COLLECTOR.

Application filed September 26, 1922. Serial No. 590,694.

*To all whom it may concern:*

Be it known that I, JOSEPH H. HANCOCK, a citizen of the United States, residing at Scottsboro, in the county of Jackson and State of Alabama, have invented a new and useful Boll-Weevil Collector, of which the following is a specification.

This invention relates to a machine for collecting and destroying boll weevils and perforated squares, one of the objects of the invention being to provide a structure which can be attached readily to a cultivator of standard construction and which, when drawn along a row of plants, will agitate the branches of the plants and dislodge the perforated squares and the boll weevils so that they will fall into pans provided therefor.

Another object is to provide improved means for agitating the plants.

A further object is to provide pans which also constitute containers for coal oil or other suitable liquid designed to destroy the insects directed thereinto.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanynig drawings the preferred form of the invention has been shown.

In said drawings—

Figure 1:
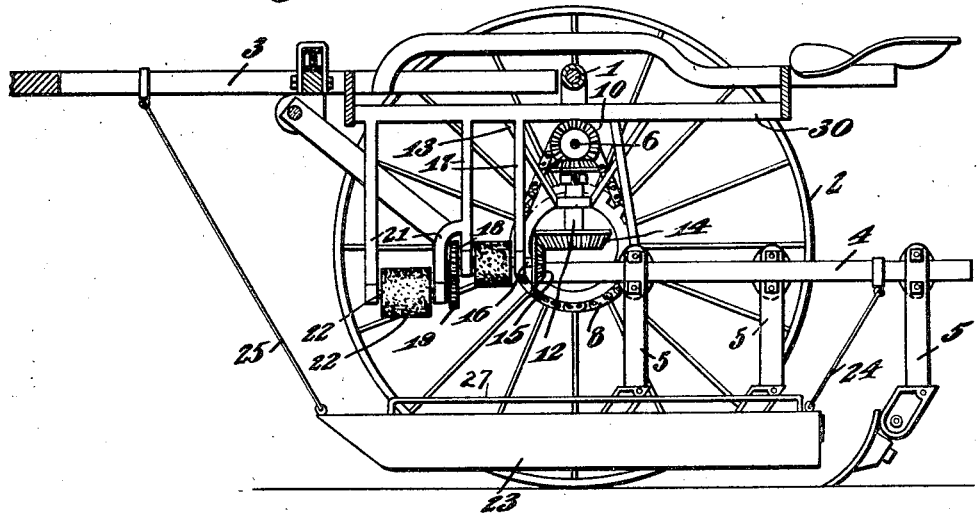
Figure 1 is a central longitudinal section through a cultivator having the present improvements combined therewith.
Figure 3:
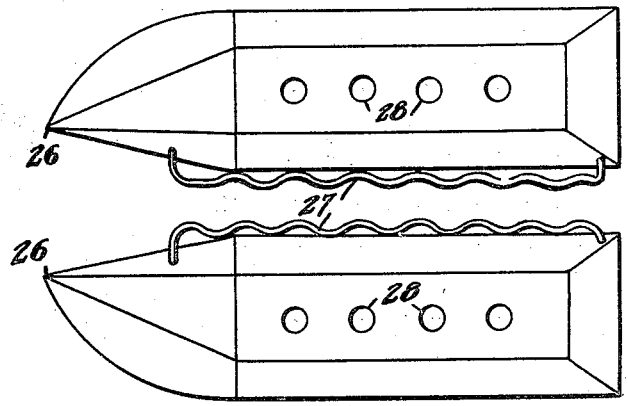
Figure 3 is a plan view of the pans.
Figure 2:
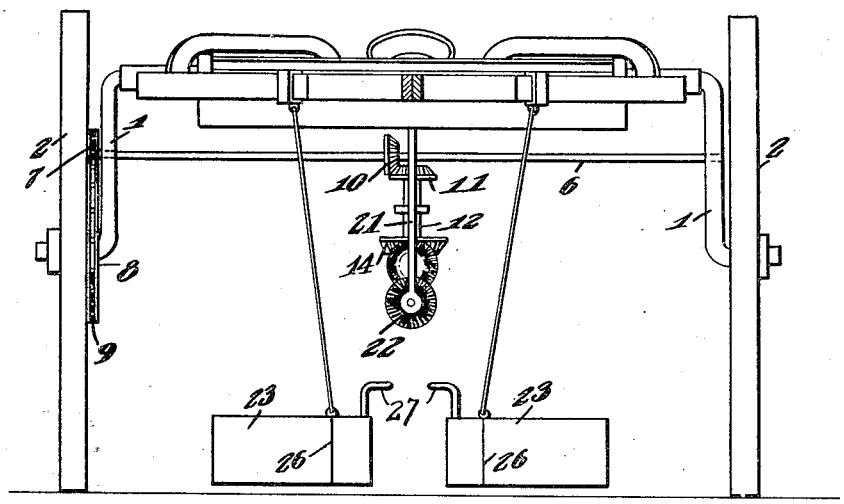
Figure 2 is a front elevation.
Figure 4:
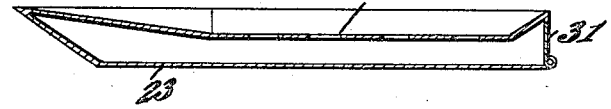
Figure 4 is a longitudinal section through one of the pans.
Figure 5:
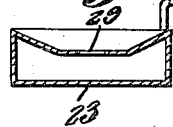
Figure 5 is a transverse section therethrough.

Referring to the figures by characters of reference 1 designates the arched axle of a cultivator supported by wheels 2 and carrying a suitable structure 3 to which beams 4 are connected. The standards 5 of the cultivators are attached to these beams. The structure thus far described constitutes a well known type of cultivator and, in itself, constitutes no part of the present invention.

Journaled on the side portions of the arched axle 1 is a transverse shaft 6 having a sprocket 7 adapted to receive motion through a chain 8 from a sprocket 9 secured to one of the wheels 2. Shaft 6 has a beveled gear 10 thereon which meshes with a beveled gear 11 secured to the upper end of a vertical shaft 12 journaled within a hanger 13 secured to the structure 3. Another beveled gear 14 is provided at the lower end of shaft 12 and meshes with a gear 15 secured to a short longitudinal shaft 16 journaled in hangers 17. A gear 18 is secured to this shaft 16 and meshes with a gear 19 secured to another short shaft 20 journaled in hangers 21. Thus the two shafts 16 and 20 will rotate in opposite directions respectively. To each of these shafts is connected a rotary brush 22 constituting agitating means.

Supported under the axle 1 are spaced longitudinal extending pans 23 supported at their back ends by rods 24 connected to the beams 4 and at their front ends by rods 25 connected to the front portion of the structure 3. The front ends of the pans are tapered to points 26 and the two pans are spaced apart a sufficient distance to receive between them the stalks of a row of plants. Mounted along the inner sides of the pans are transversely waved rods 27, the two rods being substantially parallel so as to provide a sinuous face extending longitudinally of the pans and through which the stalks extend.

The top of each pan 23 is recessed longitudinally to provide a hopper-like structure the lowermost portion of which has openings 28 through which insects can be directed into the pan. The top recess in each pan has been indicated at 29.

It is to be understood that the pans can be readily supported by connecting the rods 24 and 25 to the beams 4 and structure 3. The hangers 17 and 21 as well as the hanger 12 are preferably connected to a frame 30 which can be secured in any suitable manner to the structure 3. With the parts thus attached and the sprocket 9 connected to one wheel 2, the cultivator can be drawn along a row of plants so as to support the pans 23 at opposite sides of the row. By providing the sinuous face between the rods 27 the stalks of the plants will be swung laterally as the machine moves forward and at the same time the rotary brushes on the shafts 16 and 20 will engage the branches of the plants and, by agitating them, will knock off any perforated squares thereon and any of the boll weevils adhering to the plants. The squares and the insects will drop onto the pans and will be guided through the openings 28 through which they will drop into a suitable insecticide such as coal oil contained within the pans.

Each pan may, if desired, be formed with a tight closure 31 at one end thereof whereby the pan can be cleaned readily.

It will be noted that the structure can be sold as a complete attachment and can be applied readily to a cultivator already in use.

What is claimed is:—

1. A machine of the class described including spaced pans, means for supporting the same, separate brushes supported above the space between the pans and rotatable about parallel superposed axes, one of said brushes being in advance of the other, and means for simultaneously rotating the brushes in different directions respectively.

2. A boll weevil collector including a wheel supported structure, laterally spaced longitudinally extending collecting pans carried thereby, separate brushes mounted for rotation above the space between the pans about superposed parallel axes, one of the brushes being supported in advance of the other, means for transmitting motion to one of the brushes from the supporting wheels, and means actuated by the rotation of said brush for rotating the other brush in a direction opposite to the direction of rotation of the first named brush.

In testimony that I claim the foregoing as my own, I have hereto affixed my signature in the presence of two witnesses.

JOSEPH H. HANCOCK.

Witnesses:
T. T. KIRKPATRICK,
W. H. ROBINSON.